(12) United States Patent
Elsasser

(10) Patent No.: US 6,738,641 B1
(45) Date of Patent: May 18, 2004

(54) DISTRIBUTED TRANSCEIVER FOR WIRELESS COMMUNICATION SYSTEM

(75) Inventor: Gary Elsasser, Coto De Caza, CA (US)

(73) Assignee: Toshiba America Information Systems, Inc., Irvine, CA (US)

(*) Notice: Subject to any disclaimer, the term of this patent is extended or adjusted under 35 U.S.C. 154(b) by 506 days.

(21) Appl. No.: 09/721,471

(22) Filed: Nov. 22, 2000

(Under 37 CFR 1.47)

(51) Int. Cl.⁷ .................................................. H04B 7/00
(52) U.S. Cl. ...................... 455/523; 455/414; 455/3.05; 455/564; 370/352
(58) Field of Search ............................... 455/523, 3.01, 455/3.05, 550.1, 564, 414; 370/352

(56) References Cited

U.S. PATENT DOCUMENTS

| | | | |
|---|---|---|---|
| 5,920,818 A | * 7/1999 | Frodigh et al. | 455/443 |
| 6,366,771 B1 | * 4/2002 | Angle et al. | 455/414.1 |
| 6,377,782 B1 | * 4/2002 | Bishop et al. | 455/3.01 |
| 6,463,051 B1 | * 10/2002 | Ford | 370/352 |
| 6,483,470 B1 | * 11/2002 | Hohnstein et al. | 343/721 |
| 6,587,479 B1 | * 7/2003 | Bianchi et al. | 370/487 |

* cited by examiner

*Primary Examiner*—Nay Maung
*Assistant Examiner*—Alan T. Gantt
(74) *Attorney, Agent, or Firm*—Pillsbury Winthrop LLP

(57) ABSTRACT

A distributed transceiver for wireless communication system providing access to a public data communication network is disclosed. A plurality of RF access points are positioned in a premises to provide service coverage for mobile wireless according to a local wireless communication protocol. Each of the RF access points is coupled to a central controller by a cable to permit transmission of a low voltage DC power signal to the RF access point and transmission of uplink and downlink signals between the central controller and the RF access point.

16 Claims, 2 Drawing Sheets

DISTRIBUTED TRANSCEIVER FOR WIRELESS COMMUNICATION SYSTEM

BACKGROUND

1. Field of the Invention

Embodiments described herein are directed to wireless communication systems. In particular, embodiments relate to a system for communication with portable devices.

2. Related Art

As improvements in technology result in smaller, lighter, and more portable computing devices, a wide variety of new applications and users continue to emerge. Users do not only operate such devices in stand-alone mode. Instead, with portability users may also require the ability to send and receive information through such devices at any location. The need to communicate further arises in circumstances where hard-wired links may not be readily available or practical or when the user of the portable computing device cannot be reached immediately. Moreover, a result of user mobility is that the precise location of the user is often variable or not determined.

Commercially available personal computers or other similar devices are generally equipped with industry standard communication ports for driving a peripheral device such as a printer, a pointing device, or a modem. While operating in an unknown, remote location not connected to a network, the portable personal computer user may be unaware of messages awaiting him. In addition, conventionally, a user waits until reaching an office or other place with appropriate equipment to receive such messages and to transmit or print documents or other information prepared by the user on his personal device.

The evolution of communication standards such as Bluetooth and IEEE 802.11 has enabled the deployment of multiple transceivers at public locations or business establishments which provide wireless access points to the Internet. Accordingly, customers with mobile client devices may establish communication with points on the Internet upon being within transmission range of one of the access points.

A public location or business location offering such Internet access to customers may deploy several access points to provide effective coverage over a premises. Each access point typically consists of a transceiver, a power source and a physical connection to an Internet gateway. Such a deployment of multiple access points is costly. There is, therefore, a need for a more cost effective system and method of providing access to the Internet with mobile device over an effective coverage area at a premises.

DETAILED DESCRIPTION

Embodiments of the present invention relate to a distributed transceiver for wireless communication system that provides Internet access and other services in various private and public locations. In one embodiment, a central unit possesses an Ethernet connection directly to the Internet or to a backbone switch and a distributed transceiver.

Figure 1:
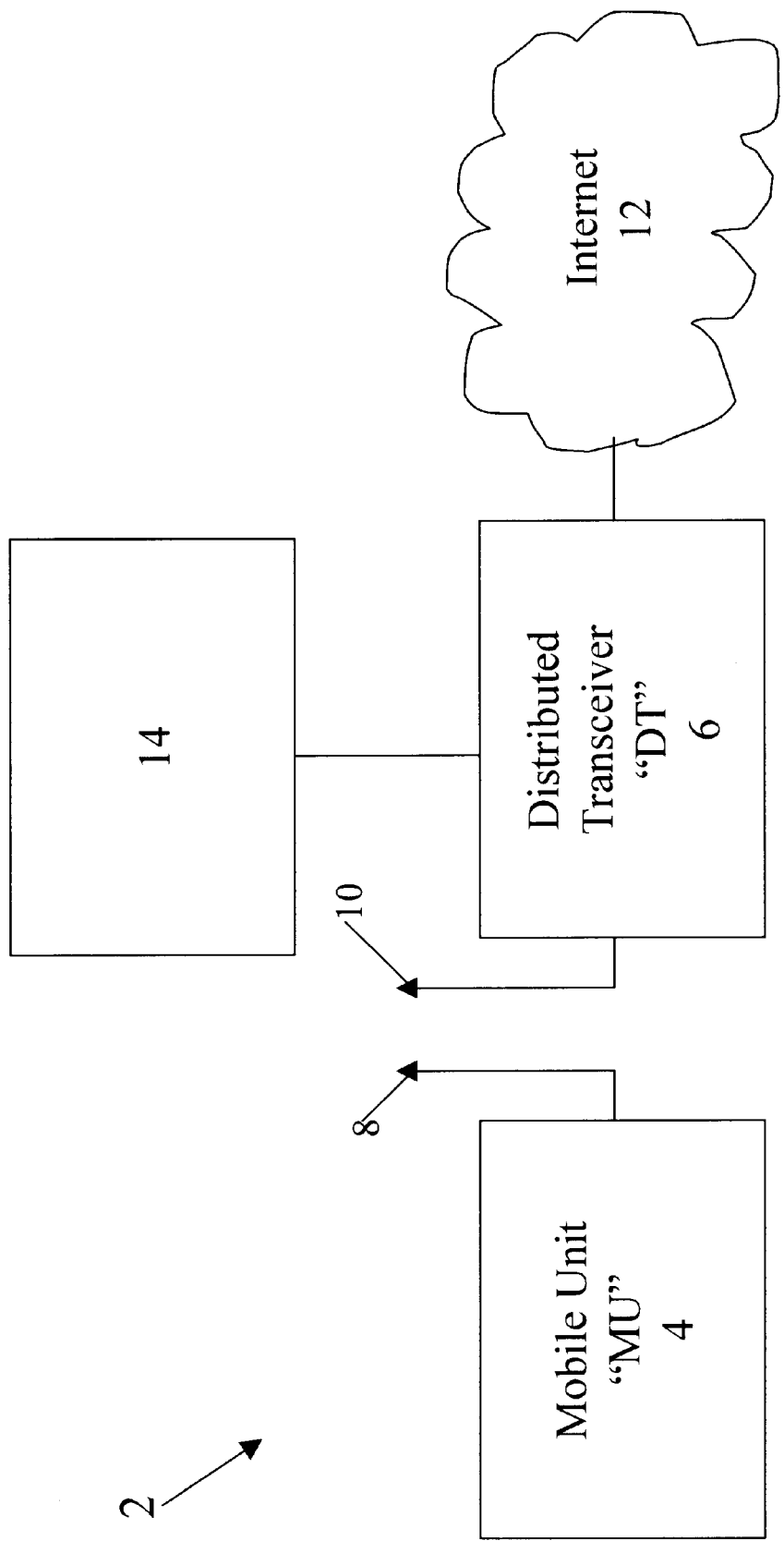
FIG. 1 is a block diagram illustrating the overall distributed transceiver for wireless communication system according to an embodiment.

FIG. 1 illustrates a distributed transceiver for wireless communication system, designated 2, according to an embodiment of the present invention. A mobile unit ("MU") 4 such as a notebook computer, personal computer ("PC"), personal digital assistant ("PDA"), cell phone, pager, or a similar portable device includes an antenna 8. The MU 4 is capable of communicating with points on a digital communicator network using local access wireless communication protocol according to the Bluetooth or IEEE 802.11 standards, or other suitable standard for communicating with points on a digital communication network.

Bluetooth is a high-speed, short-range, low-power microwave wireless link technology designed to connect various types of devices such as laptops, cell phones, pagers, PDAs, and other portable equipment together with little or no work by the user. Bluetooth devices can communicate by wireless signals within a 35-foot range, and do not need a line-of-sight connection. The Bluetooth technology uses modifications of existing wireless local area network ("WLAN") techniques which enables communication according to an Internet Protocol (IP).

In a similar fashion, IEEE 802.11 is the standard for WLANs, capable of specifying an "over the air" interface between a wireless client and a base station or access point, as well as among wireless clients. The Media Access Control ("MAC") under 802.11 is composed of several functional blocks that include mechanisms to provide contention and contention-free access control on a variety of physical layers. The MAC layer is supported by an underlying Physical ("PHY") layer that includes diffused infra-red ("DFIR"), direct sequence spread spectrum ("DSSS"), and frequency hopped spread spectrum ("FHSS"). Both spread spectrum techniques are used in the 2.4 GHz band because of wide availability in many countries and lower hardware costs in comparison to the higher microwave frequencies.

In the illustrated embodiment, the local access wireless communication protocol facilitates cable-free connections to a data communications network such as the Internet 12 in various private/public environments 14 such as hotels, conference centers, airports, airplanes, train stations, trains, restaurants, coffee shops, and similar establishments. By saturating the environments 14 with wireless connectivity according to the local access wireless communication protocol and enabling the MUs 4 to communicate according to this protocol, a customer may access points on the Internet 12 upon moving to within range of the DT 6. A client user equipped with an MU 4 may enter a premises. If this environment 14 is populated with a DT 6, the client user may activate his MU 4 and communicate with points on the Internet 12.

A traveler in a foreign country may experience difficulties in making a successful connection because of varying jacks and possibly the unavailability of wired connections. Bluetooth has a low enough power such that it may be used in such a foreign locale to form a bridge to a wired network either directly inside a building or to a cell phone. According to an embodiment, an infrastructure is also in place such that Internet 12 access may be available regardless of an individual's device configuration.

As previously discussed, MU 4 is connected to antenna 8. DT 6 is also connected to an antenna 10 that can both receive and transmit radio frequency ("RF") signals at designated transmit and receive frequency bands. RF signals over the air from DT 6 are received by antenna 8 and sent to MU 4.

Figure 2:
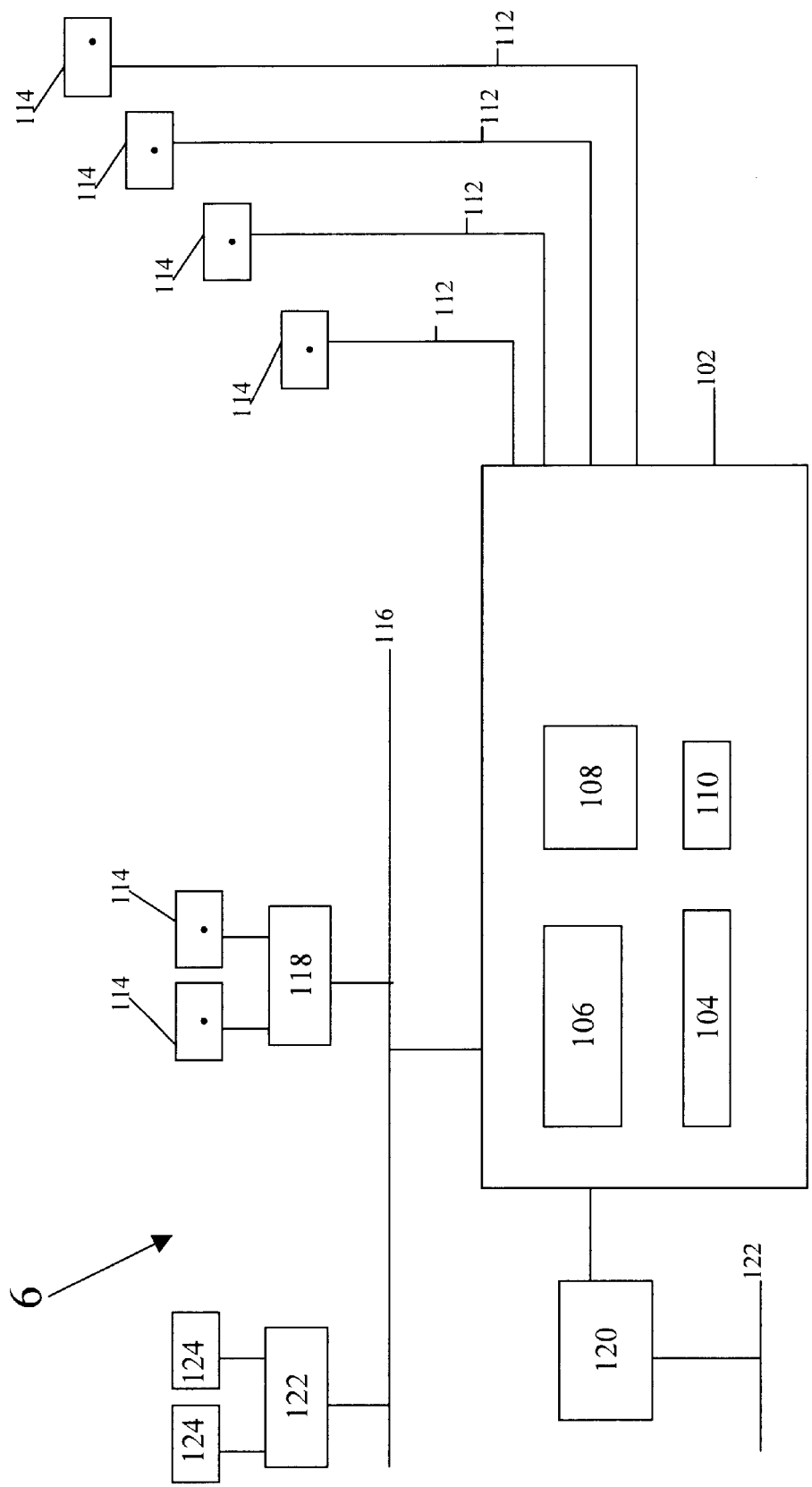
FIG. 2 is a block diagram of the composition of a distributed transceiver, according to the system of FIG. 1.

FIG. 2 illustrates the composition of a DT 6 according to an embodiment. The DT 6 may include an appliance server ("AS") 102. AS 102 is a wireless access server that contains a power supply 104, one or more Ethernet controllers 106, and a digital signal processor ("DSP") 108. Also included within AS 102 is a processor 110 having logic such as, but not limited to, Network Address Translation ("NAT") logic and Dynamic Host Configuration Protocol ("DHCP") logic.

The DT 6 also includes one or more RF access points 114. Each RF access point 114 is coupled to the DSP 108 and power supply 8 through a cable. The RF access points 114 may be distributed throughout the environment 14 to provide RF coverage for MUs 4 at points in the environment 14. Each RF access point 114 includes an antenna (not shown) and RF front end circuitry for transmitting uplink signals received from the MUs 4 to the DSP, and transmitting downlink signals from the DSP 108 to the MUs 4 according to the local access wireless communication protocol.

The DSP 108 may include combinations of ASIC logic and micro controllers executing micro code instructions. The DSP 108 may demodulate RF signals received from the access points 114 to provide digital data transmitted in the uplink signals and modulate digital data from the processor 110 for transmission to the access points 114 as the downlink signals. The DSP 108 may be scalable to communicate with any number of access points 114. For example, the DSP 108 may include a separate mixed signal integrated circuit (not shown) for each access point 114 coupled to a single hub controller (not shown) for communication with the processor 110. Alternatively, the uplink transmissions from the access points 114 may be multiplexed to a single point at the DSP 8 to be demodulated while the DSP 108 demultiplexes and modulates the downlink transmissions from the processor 110 for transmission through the access points 114.

The Ethernet controller 106 may couple the processor 110 to an Internet gateway processor (not shown) for communicating with points on the Internet 12. Accordingly, transmissions at each of the access points 114 may access the Internet 12 through a single Ethernet controller 106. A NAT gateway may be employed to reduce the requirement for publicly assigned Internet Protocol ("IP") addresses, expand an existing network without affecting existing IP based account schemes, and hide an internal network schema from public networks.

DHCP is a protocol that allows network administrators to manage centrally and automate the assignment of IP addresses in a network. The DHCP may eliminate the need for assigning a new IP address when an MU 4 moves to a location in another part of a network. DHCP further supports static addresses for processors hosting web servers that require a permanent IP address. NAT and DHCP require processing resources which may be built into AS 102 to compose a kind of networking intelligence. A low DC power consumption along with the elimination of a separate DSP, memory, and Ethernet controller may further result in a low cost of installation for the distributed transceiver for wireless communication system 2.

AS 102 is coupled to cables 112, which may be category fire cables having eight wires. In the illustrated embodiment, four of the wires transmit low voltage (e.g., between about 5.0 and 15.0 volts) DC power from the PS 104 an RF access point 114. The remaining four wires transmit RF signals bi-directionally between the DSP 108 and the RF access point 114. High level processing is performed, however, at the processor 110 to facilitate communication according to the aforementioned communication protocols.

AS 102 may further be connected to a backbone 116 as part of a local area network. The backbone 116 may provide high-speed Internet 12 access through the AS 102. The backbone 116 may also provide access through RF access points 114 coupled to the Internet 12 through a slave controller 118. Here, the slave controller 118 may transmit low voltage DC power to the coupled RF access points 114 and enable bi-directional communication through an eight-wire category five cable as discussed above. Also, MAC controllers 122 may be coupled to the backbone 116 to couple devices 124 to the Internet 12 via a wired connection.

In addition, the AS 102 infrastructure may further be connected directly to a private branch exchange ("PBX") 120 system that is connected to conventional landlines 122 and a public switched telephone network (PSTN). The PBX 120 Logic at the PBX 120 or the AS 102 may then employ a least cost routing scheme to direct calls from extensions on the PBX 120 to the Central Office on a local loop or to the Internet 12 according to a VoIP protocol.

In addition, a headset, which is essentially a speaker, a Bluetooth-ready module, and a battery may be used in a DT 6 saturated environment to perform wireless communications. Either with connection to the PSTN through the PBX 120 or with voice over IP for lowest cost, a voice over IP gateway may be created that will be capable of making inexpensive voice over IP connections in any location.

Another example of the multiple ways in which a DT 6 environment 14 may be utilized is in conjunction with software programs such as PC Anywhere. For instance, an Ethernet connection may be made to a Bluetooth or IEEE 802.11-ready MU 4 and a snapshot of the screen of MU 4 may be taken. A reduced quality strain may then be sent back to MU 4 along with keyboard and mouse commands. Basically, MU 4 may be remotely controlled whereby all functions, computations, and the like are performed on the opposite end of the connection.

An office building, for example, may be saturated with distributed transceiver for wireless communication system 2 to replace of augment fixed wire communication device. A mobile device may be dropped in any location necessary, and a voice over IP system makes the connection. With a high-speed server that is connected to Internet 12 installed in the building, a user may simply turn on a web browser and acquire instantaneous access to a multitude of information as well as services.

For example, a user can receive information such as the weather forecast, leading news stories, and area restaurants provided that MU 4 has a method of determining its own location. Restaurant reservations, plane reservations, and car rental reservations are several examples of the many services that may then be provided.

With the use of either Bluetooth or IEEE 802.11 wireless technologies, each MU 4 is equipped with an identification code that can be transmitted to and recognized by distributed transceiver for wireless communication system 2 that allows recognition of MU 4 prior to providing access to system services. The unique identification may provide a measure of security as well as a service billing mechanism.

Payment for Internet 12 access may be accomplished in numerous ways. For instance, a local transceiver may ask for the customer's credit card number or some other kind of account number. Billing may be conducted by hour, by day, by month, etc. Of course, different environments 14 may employ varying billing methods. For example, a sales feature at Starbucks may be to offer free Bluetooth or IEEE 802.11 access with a purchase.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A system of providing mobile devices access to a public data communication network according to a local wireless communication protocol, the system comprising:
   a central controller having a network processor for communicating with points on the public data communication network according to a packet switched network communication protocol, a power supply to generate DC power, and a digital signal processor for demodulating uplink radio frequency (RF) signals to provide digital data to the network processor and modulating digital data from the network processor to provide one or more downlink RF signals;
   a plurality of RF access points, each of the RF access points having an antenna, circuitry for transmitting the downlink signal to and receiving the uplink signal from proximate mobile devices in wireless communication with the central controller through the RF access point; and
   for each of the RF access points, a cable coupled between the central controller and the RF access point to transmit the DC power to the RF access point and to transmit the uplink and downlink RF signals between the proximate mobile devices and the central controller.

2. The system of claim 1, wherein the cable includes eight wires.

3. The system of claim 1, wherein the local wireless communication protocol is substantially compliant with at least one of the Bluetooth and IEEE 802.11 wireless communication protocols and the public data communication network includes the Internet.

4. The system of claim 1, wherein the DC power is between about 5.0 and 15.0 volts.

5. The system of claim 1, wherein the public data communication network includes the Internet and the system further includes a connection to a private branch exchange (PBX) coupled to a local loop, and wherein the processor includes logic for determining a least cost call route from points on the PBX from among routes including the local loop and voice over the Internet.

6. The system of claim 1, wherein the digital signal processor includes a plurality of discrete mixed-signal circuits, each mixed-signal circuit being adapted to transmit a downlink signal to and receive an uplink signal from a corresponding one of the RF access points, and a hub for combining digital data from each of the mixed signal circuits for transmission to the network processor.

7. A method of installing a transceiver system in a premises to permit access to a public data communication network through mobile communication devices, the method comprising:
   installing at the premises a central controller having a network processor for communicating with points on the public data communication network according to a packet switched network communication protocol, a power supply to generate DC power, and a digital signal processor for demodulating uplink radio frequency (RF) signals to provide digital data to the network processor and modulating digital data from the network processor to provide one or more downlink RF signals;
   installing at the premises a plurality of RF access points, each of the RF access points having an antenna, circuitry for transmitting the downlink signal to and receiving the uplink signal from proximate mobile devices in wireless communication with the central controller through the RF access point; and
   for each of the RF access points, coupling a cable between the central controller and the RF access point to transmit the DC power to the RF access point and to transmit the uplink and downlink RF signals between the proximate mobile devices and the central controller.

8. The method of claim 7, wherein the cable includes eight wires and the method further comprises:
   coupling four of the wires to permit transmission of the DC power from the power supply to the RF access point; and
   coupling four of the wires between the digital signal processor to permit the transmission of RF signals between the digital signal processor and the wireless access point.

9. The method of claim 7, wherein the local wireless communication protocol is substantially compliant with at least one of the Bluetooth and IEEE 802.11 wireless communication protocols and the public data communication network includes the Internet.

10. The method of claim 7, wherein the DC power is between about 5.0 and 15.0 volts.

11. The method of claim 7, wherein the public data communication network includes the Internet and the method further comprises coupling the network processor to a private branch exchange (PBX) coupled to a local loop; and wherein the processor includes logic for determining a least cost call route from points on the PBX from among routes including the local loop and voice over the Internet.

12. The method system of claim 7, wherein the digital signal processor includes a plurality of discrete mixed-signal circuits, each mixed-signal circuit being adapted to transmit a downlink signal to and receive an uplink signal from a corresponding one of the RF access points, and a hub for combining digital data from each of the mixed signal circuits for transmission to the network processor.

13. A system of providing mobile devices access to a public data communication network according to a local wireless communication protocol, the system comprising:
   a plurality of radio frequency (RF) access points, each of the RF access points having an antenna, and circuitry for transmitting an uplink RF signal and receiving a downlink RF signal;
   a central controller having a network processor to transmit digital data and to receive digital data, a power supply to generate DC power, and a digital signal processor for demodulating the uplink RF signal to provide digital data to the network processor and modulating digital data from the network processor to provide the downlink RF signal,
   a plurality of cables, wherein each of the plurality of cables directly connects a corresponding RF access point to the central controller and transmits the downlink RF signals and the uplink RF signals between the plurality of RF access points and the central controller; and a gateway processor, coupled to the central controller, to supply digital data to the network processor, to receive digital data from the network processor and to provide a pathway for the plurality of RF access points to access the public data communication network.

14. The system of claim 13, wherein each of the plurality of cables transmits DC power from the power supply to each of the plurality of access points.

15. The system of claim 13, wherein the digital signal processor includes a plurality of discrete mixed signal circuits, each mixed-signal circuit being adapted to transmit a downlink signal to and receive an uplink signal from a corresponding one of the RF access points.

16. The system of claim 15, wherein the digital signal processor further includes a hub for combining digital data from each of the mixed-signal circuits for transmission to the network processor.

* * * * *